April 16, 1935. W. L. MORRISON 1,998,285
VENTILATING DEVICE FOR AUTOMOBILES
Filed Oct. 6, 1933 4 Sheets-Sheet 1
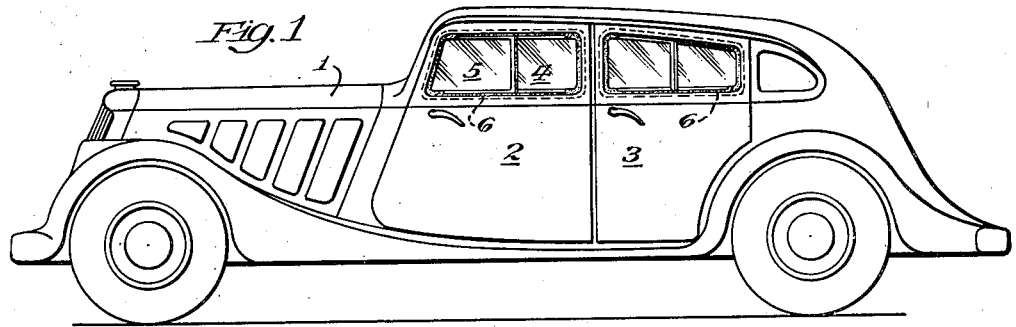
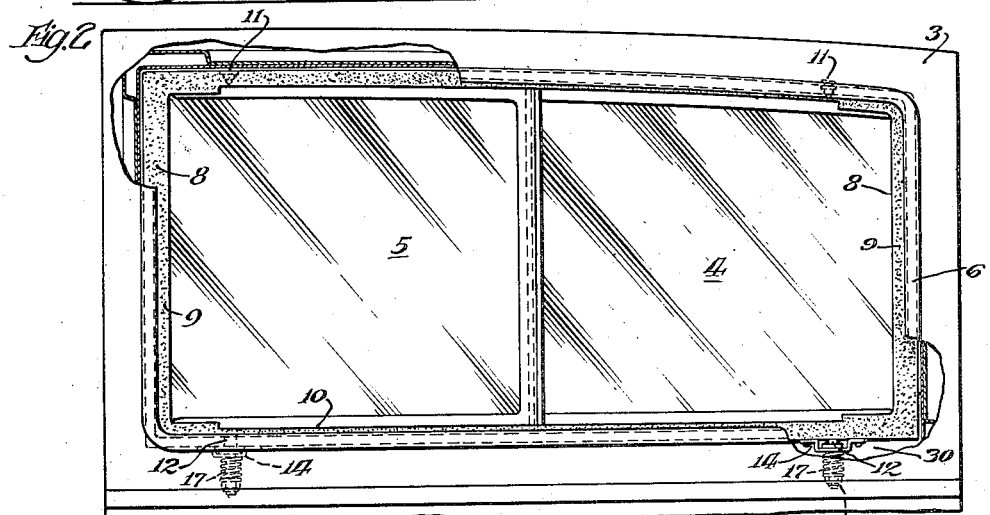
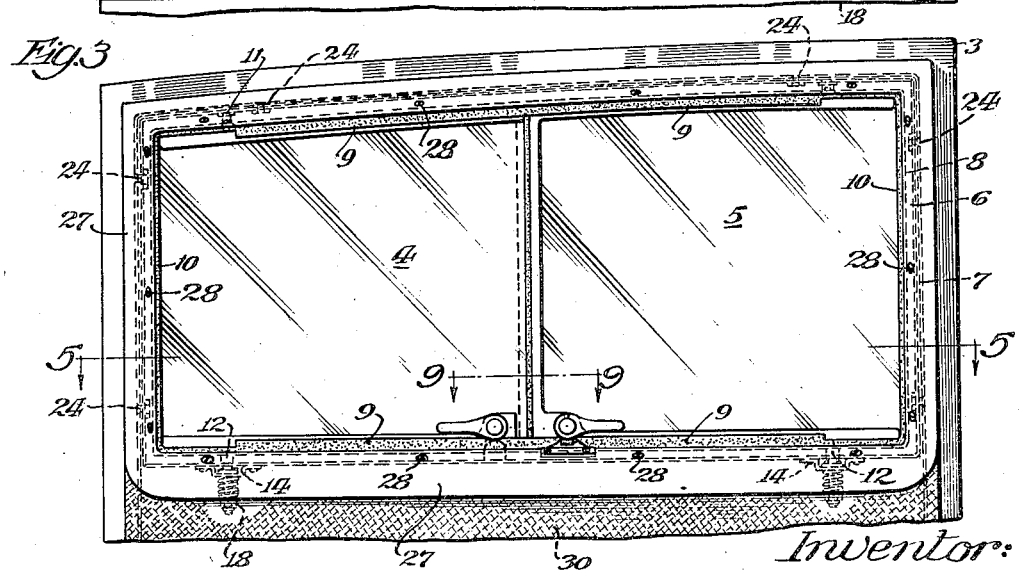
Inventor:
Willard L. Morrison
By Parker & Carter
Attys

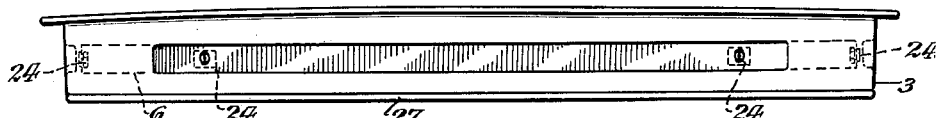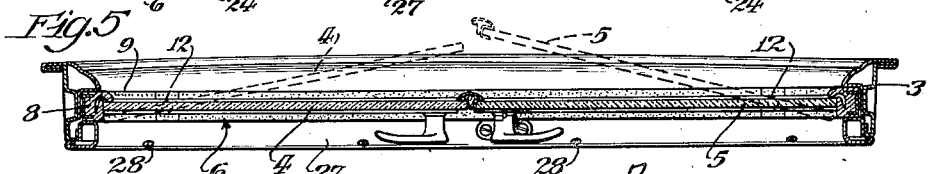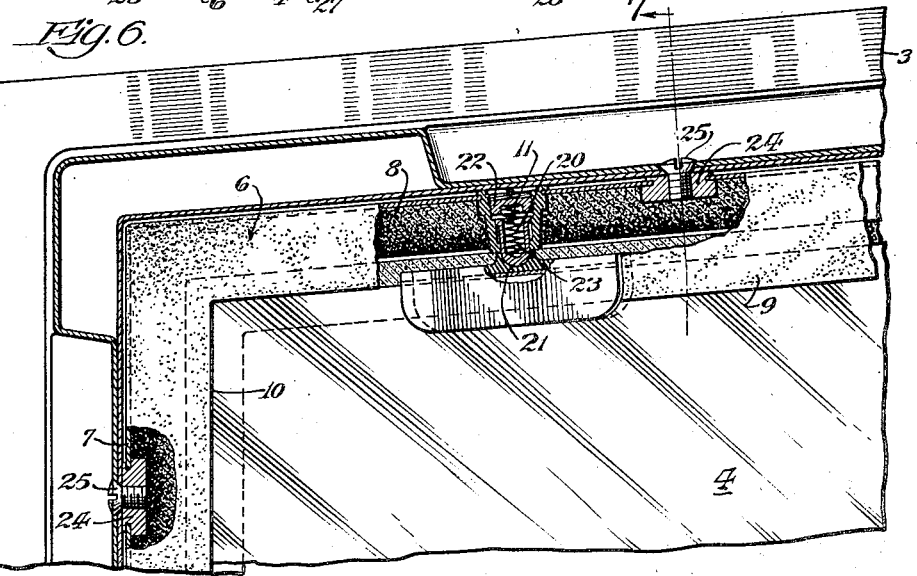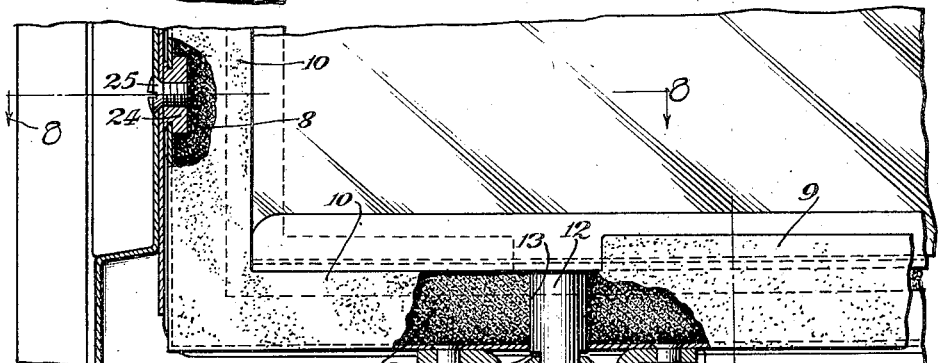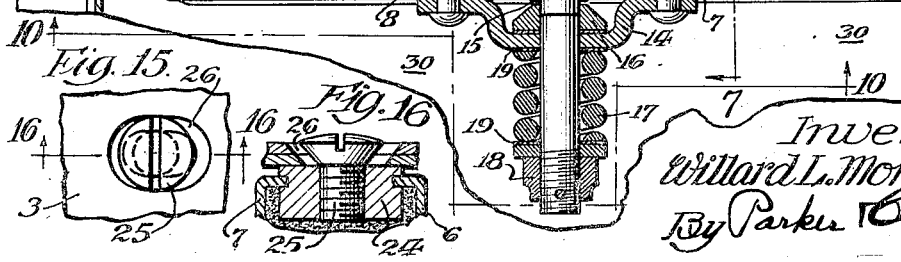

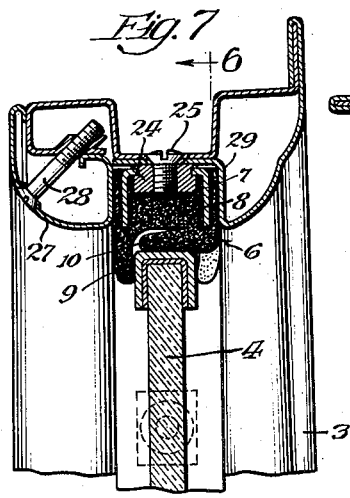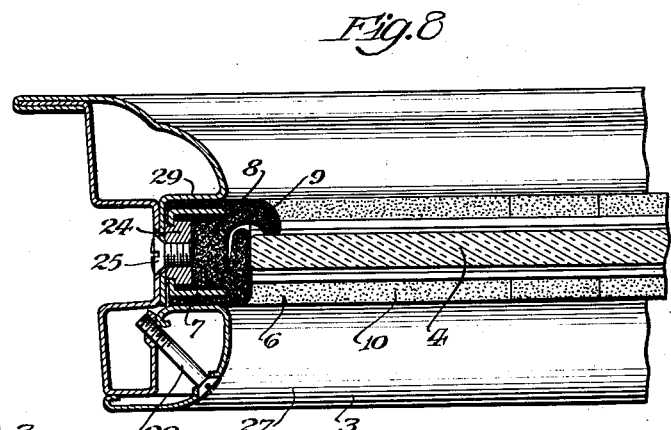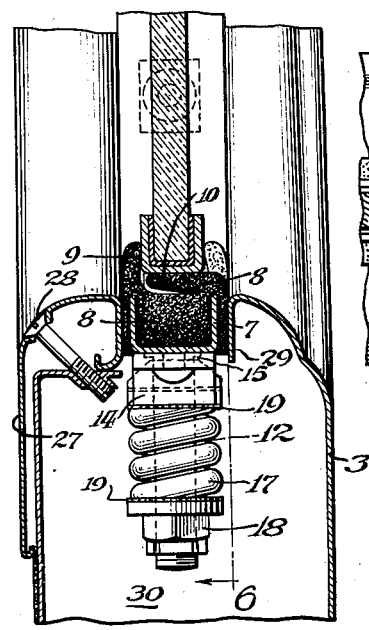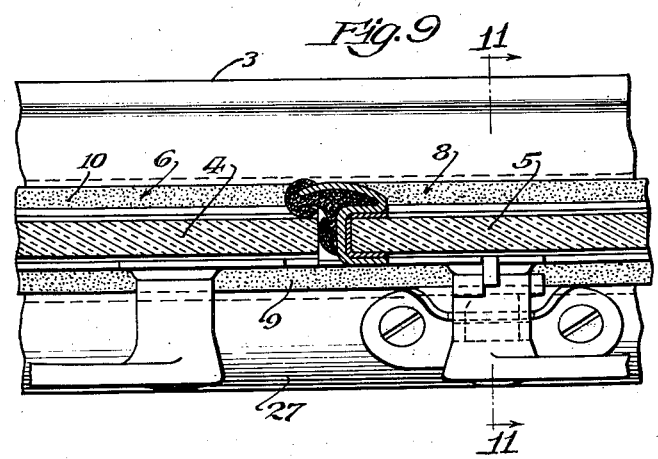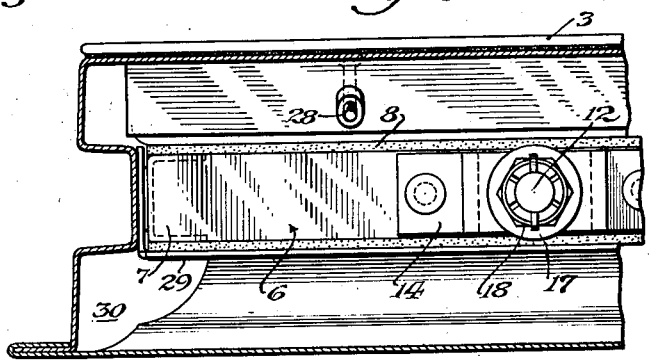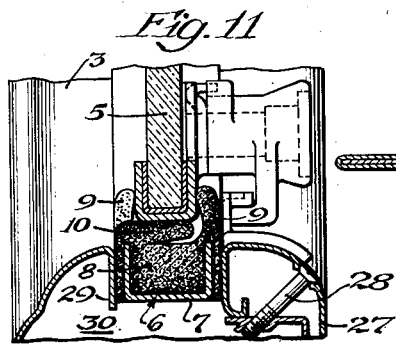

April 16, 1935. W. L. MORRISON 1,998,285
VENTILATING DEVICE FOR AUTOMOBILES
Filed Oct. 6, 1933 4 Sheets-Sheet 4
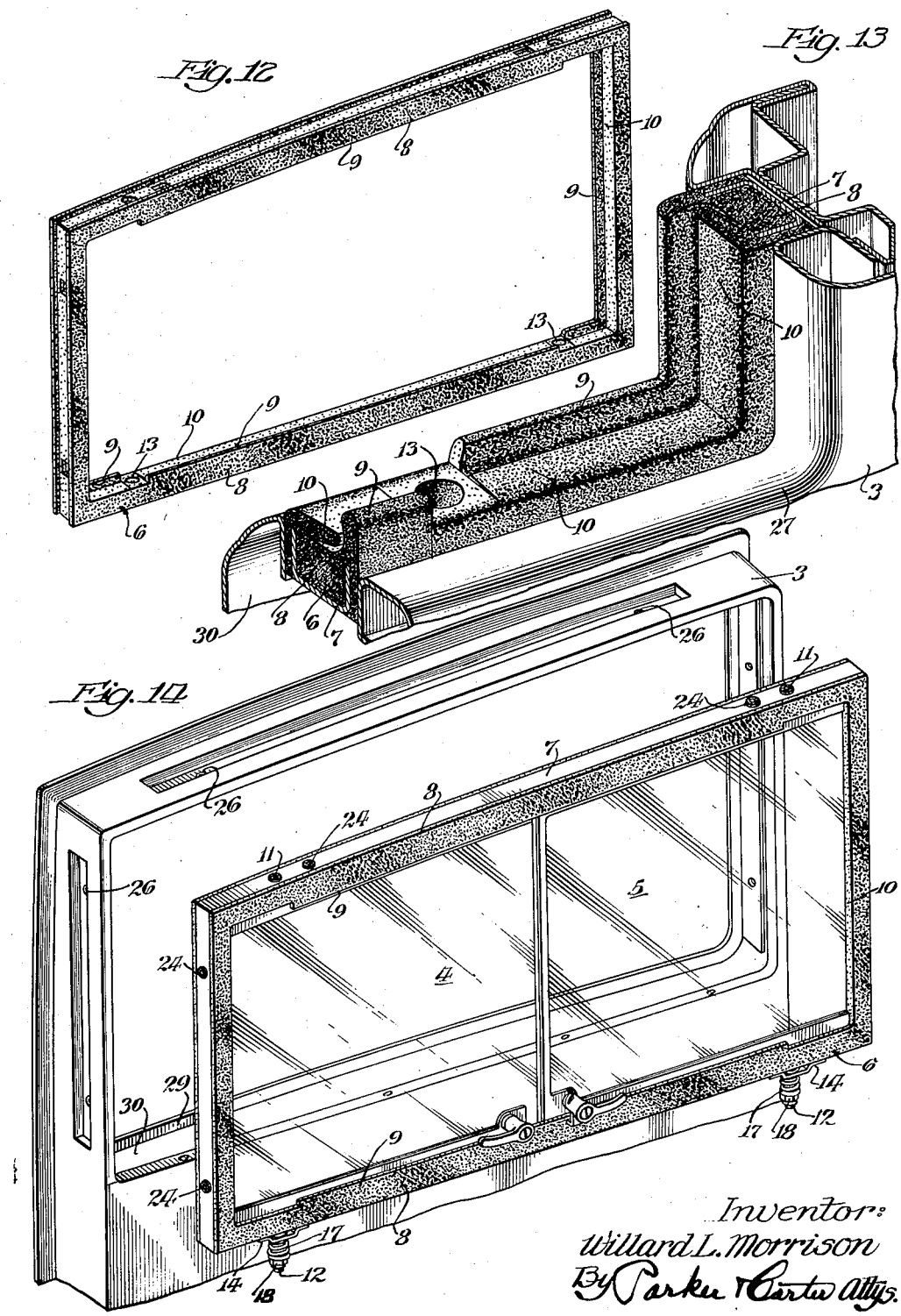

Patented Apr. 16, 1935

1,998,285

UNITED STATES PATENT OFFICE 1,998,285

VENTILATING DEVICE FOR AUTOMOBILES

Willard L. Morrison, Lake Forest, Ill.

Application October 6, 1933, Serial No. 692,387

6 Claims. (Cl. 296—44)

This invention relates to ventilating devices for automobiles and has for its object to provide a new and improved device of this description. The invention has as a further object to provide a ventilating device with two pivoted windows mounted in a sealing member, the sealing member being continuous and forming a seal for the edges of the windows when closed. The invention has as a further object to provide such a sealing member in which the windows are mounted which is inserted in slots or recesses in the window frame or reveal. The invention has as a further object to provide such a sealing member in which one or more pivoted windows are mounted, the pivots being inserted in openings in the sealing member and being surrounded by the sealing material. The invention has as a further object to provide a ventilating device for automobiles wherein there is one or more pivoted windows mounted in a sealing member which acts as a frame for the window or windows, the frame and the window or windows being a separate unit adapted to be placed in position in the window opening in an automobile or automobile door which has been previously manufactured for sliding windows with a door pocket. The invention has other objects which are more particularly pointed out in the accompanying description.

Referring now to the drawings, Fig. 1 is a view showing an automobile with a ventilating device embodying the invention;

Fig. 2 is an enlarged view of the upper part of the rear ventilating device with parts broken away;

Fig. 3 is an inside view of the part shown in Fig. 2 showing the frame assembly secured within the window opening;

Fig. 4 is a top view of one of the doors supplied with the ventilating device;

Fig. 5 is a sectional view taken on line 5—5 of Fig. 3;

Fig. 6 is an enlarged fragmentary view of the left hand portion of Fig. 3 showing how the sealing frame is secured in the window opening;

Fig. 7 is a vertical sectional view taken on line 7—7 of Fig. 6 showing the sealing frame in place between the reveals and the garnish molding;

Fig. 8 is a fragmentary section taken on line 8—8 of Fig. 6;

Fig. 9 is an enlarged sectional view taken on line 9—9 of Fig. 3;

Fig. 10 is a fragmentary section looking upward on line 10—10 of Fig. 6;

Fig. 11 is a sectional view taken on line 11—11 of Fig. 9;

Fig. 12 is a perspective view of the sealing frame with the windows removed;

Fig. 13 is an enlarged detail showing a corner of the rubber sealing frame set in place between the garnish molding and the reveal with the window removed;

Fig. 14 is a perspective view of the sealing frame with the windows therein about to be assembled in the window opening;

Fig. 15 is a view looking at one of the fastening screws for holding the sealing frame in position in the window opening;

Fig. 16 is a sectional view taken on line 16—16 of Fig. 15;

Like numerals refer to like parts throughout the several figures.

Referring now to the drawings, I have shown an automobile 1 having a ventilating device embodying the invention. In this construction I have shown the doors 2 and 3, each door being provided with one of the ventilating devices. As the ventilating devices are the same, I will describe only one of them.

In the construction shown there are two windows 4 and 5. These windows are pivotally mounted in a sealing frame 6, the entire sealing frame and the windows being separately made and assembled and ready to be inserted in the window opening. In the construction shown the sealing frame 6 is made up of a stiffening member 7, preferably of metal, and preferably of U shape construction, see Fig. 7. This member is embedded in a rubber member 8 which has engaging member 9 engaging the face of the pivoted window and a member 10 which engages the edge of the window. This frame extends entirely around the two windows 4 and 5. The window 4 is provided with an upper pivot 11 and a lower pivot 12 which project into the sealing frame. The pivot 12 passes through an opening 13, see Fig. 13, in the rubber 8 and through the reinforcing member 7 and through a bracket 14 connected with said reinforcing member.

Some means is provided for resisting the pivotal movement of the window. As herein shown the pivot 12 is provided with a shoulder 15 which engages a member 16 supported on the bracket 14. A spring 17 surrounds the pivot and is pressed toward the bracket by a nut 18. There are friction washers 19 against which pressure is applied by the compression of the spring, and these frictionally resist the rotation of the window. The upper pivot 20 is fastened to the sealing frame in any desired manner and engages the pivoted window.

In the construction shown in Fig. 6 this pivot 20 is hollow and fits into a recess 21 in the window and is held in place by a nut 22, there being a spring 23 interposed between the nut and the pivot. The sealing frame has embedded in it at intervals the fastening pieces 24, see Figs. 6, 7 and 8, and this sealing frame, when placed in the window opening, is held in place by screws 25 which pass through the window frame and which enter threaded openings in these fastening pieces 24. The window frame is preferably provided with elongated openings 26, see Figs. 15 and 16, which permit adjustment of the screws to account for inaccuracies in the placing of the openings and the fastening pieces. The fastening pieces 24 are placed on the upper side and the two ends of the sealing frame section. The other window 5 is provided with similar pivots, and in the construction shown the sealing frame member passes around both windows and the pivots are connected in position as described in connection with window 4.

When the sealing frame and the pivoted windows are assembled, the device is inserted in position in the window opening. I have illustrated the device in connection with one of the doors of an automobile which has been made for a sliding window, that is a window that slides up and down. In placing the present device in position the garnish molding 27 is removed and the sealing frame is slipped into position, as shown in Fig. 7, and the fastening screws 25 placed in position. The garnish molding 27 is then placed in position and the screws 28, which are preferably inclined as shown, tightened up and this compresses the sealing frame between the garnish molding and the member 29, see Fig. 7, making a water tight joint or seal between them all the way around.

This device, therefore, is a double sealing device. It seals the edges of the windows when closed and it seals the receiving space in which it is mounted, the frame itself being sealed all the way around. There is here provided a pair of windows mounted in a sealing member, the sealing member being continuous and forming a sealing packing around each pivot and sealing members which engage the window edges when closed, the frame sealing itself when in position. It will be noted that when in position this sealing frame seals the opening into the window pocket 30 which is adapted to receive the sliding window for which the automobile is made. It will further be seen that the friction pivot 12 passes down through this opening into the pocket 30.

I claim:

1. A ventilating device for automobiles having a window opening, comprising a sealing frame of sealing material, a stiffening member embedded therein, a window pivotally mounted in said frame and adapted to be moved pivotally with relation to said frame to open it, the sealing material of the frame engaging the window when closed to seal its edges, the whole forming a self-contained unit.

2. A ventilating device for automobiles having a window opening, comprising a sealing frame of sealing material, a stiffening member embedded therein, a window pivotally mounted in said frame and adapted to be moved pivotally with relation to said frame to open it, the sealing material of the frame engaging the window when closed to seal its edges, the whole forming a self-contained unit, means for fastening said sealing frame in the window opening of the automobile, and pressure applying means surrounding the window opening for applying pressure to said sealing frame to cause it to seal the opening in which it is received.

3. A ventilating device for automobiles having a window opening, comprising a sealing frame of sealing material, a stiffening member embedded therein, two pivoted windows pivotally mounted in said frame and adapted to be moved pivotally with relation to said frame to open it, the sealing material and the stiffening member being provided with openings through which said pivots pass, the sealing material surrounding the pivots, and means for holding said pivots in position, the whole forming a self-contained unit.

4. A ventilating device for automobiles having a window opening, comprising a sealing frame of sealing material, a stiffening member embedded therein, a window pivotally mounted in said frame and adapted to be moved pivotally with relation to said frame to open it, the sealing material of the frame engaging the window when closed to seal its edges, one side of said sealing frame being engaged by a part on the automobile surrounding the window opening, an adjustable part on the other side of said frame which engages it and presses it against the part on the automobile so as to cause the sealing material of the sealing frame to seal the space around the sealing frame.

5. A ventilating device for automobiles having a window opening, comprising a sealing frame of sealing material, a stiffening member embedded therein, a window pivotally mounted in said frame and adapted to be moved pivotally with relation to said frame to open it, the sealing material of the frame engaging the window when closed to seal its edges, stationary fastening pieces embedded in said sealing frame and spaced about its edges for receiving it, removable fastening devices for fastening it in position in the window opening, the whole forming a self-contained unit.

6. A ventilating device for automobiles having a window opening, comprising a sealing frame of sealing material, a stiffening member embedded therein, a window pivotally mounted in said frame and adapted to be moved pivotally with relation to said frame to open it, the sealing material of the frame engaging the window when closed to seal its edges, said stiffening member comprising a channel shaped metal piece having its open side facing the said window.

WILLARD L. MORRISON.